Figure 1:
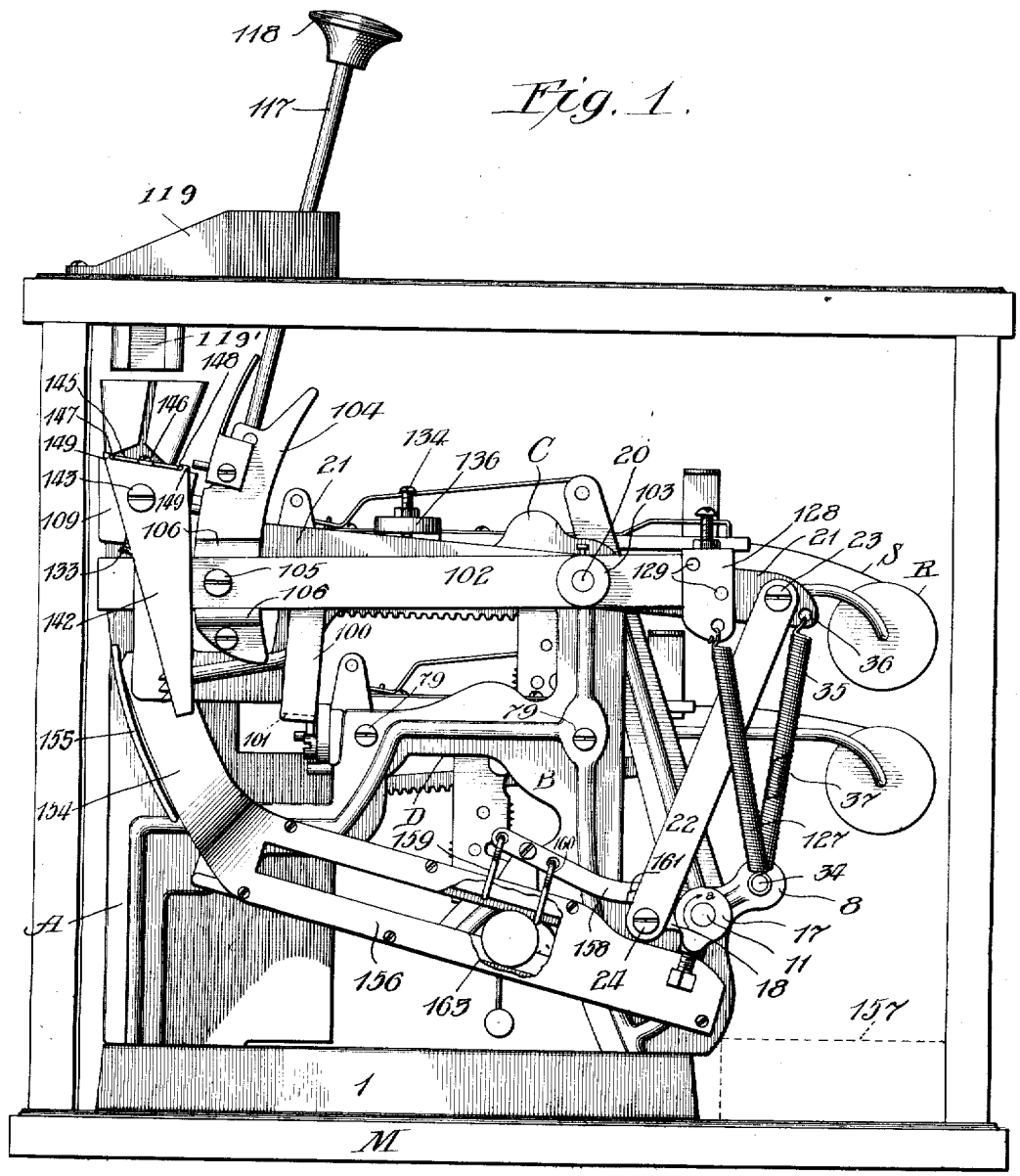

T. BRIEGEL & M. O. GRISWOLD.
STAMP VENDING MACHINE.
APPLICATION FILED AUG. 28, 1912. RENEWED MAY 10, 1915.

1,162,128. Patented Nov. 30, 1915.
7 SHEETS—SHEET 1.

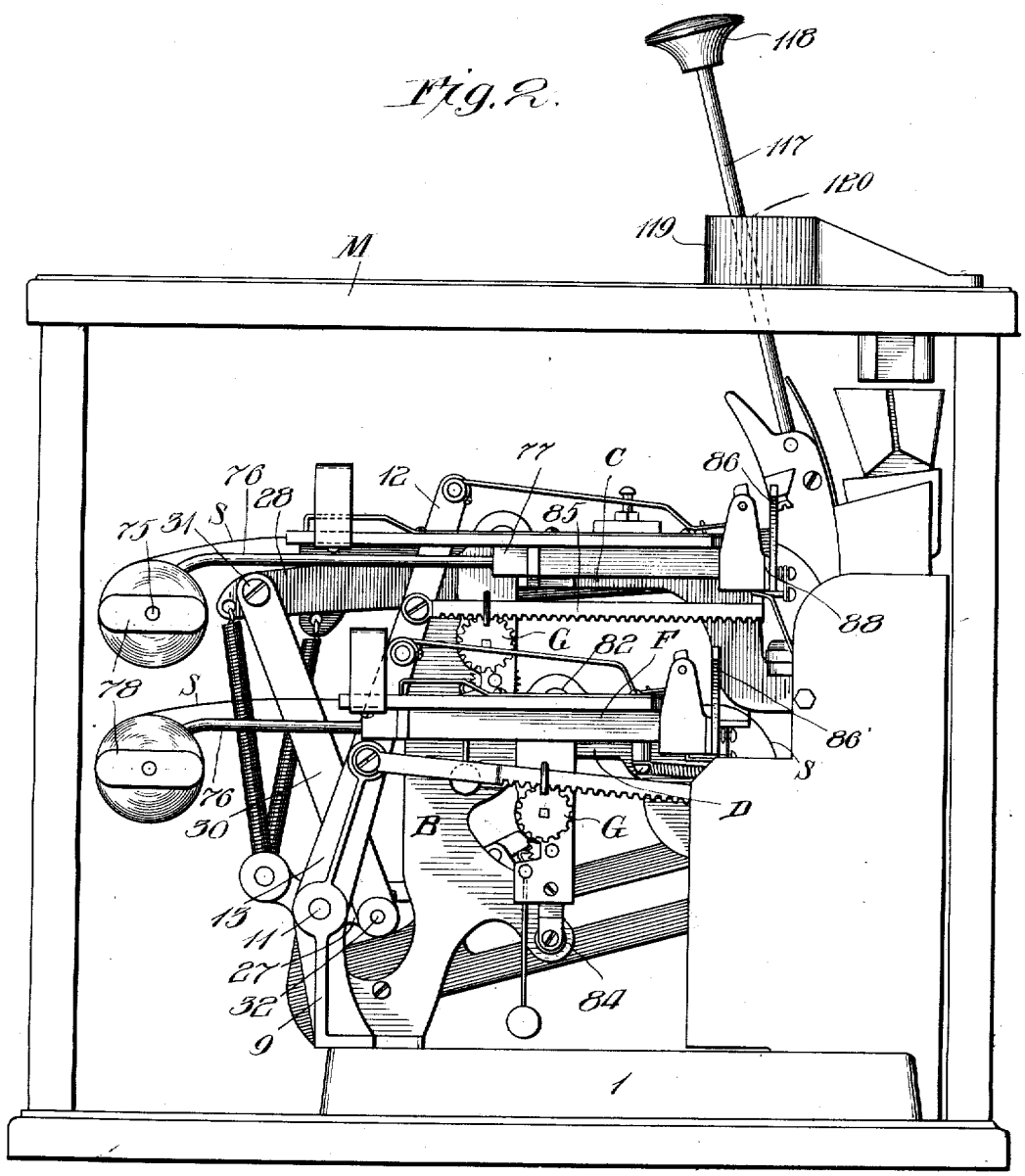

T. BRIEGEL & M. O. GRISWOLD.
STAMP VENDING MACHINE.
APPLICATION FILED AUG. 28, 1912. RENEWED MAY 10, 1915.
1,162,128.
Patented Nov. 30, 1915.
7 SHEETS—SHEET 3.
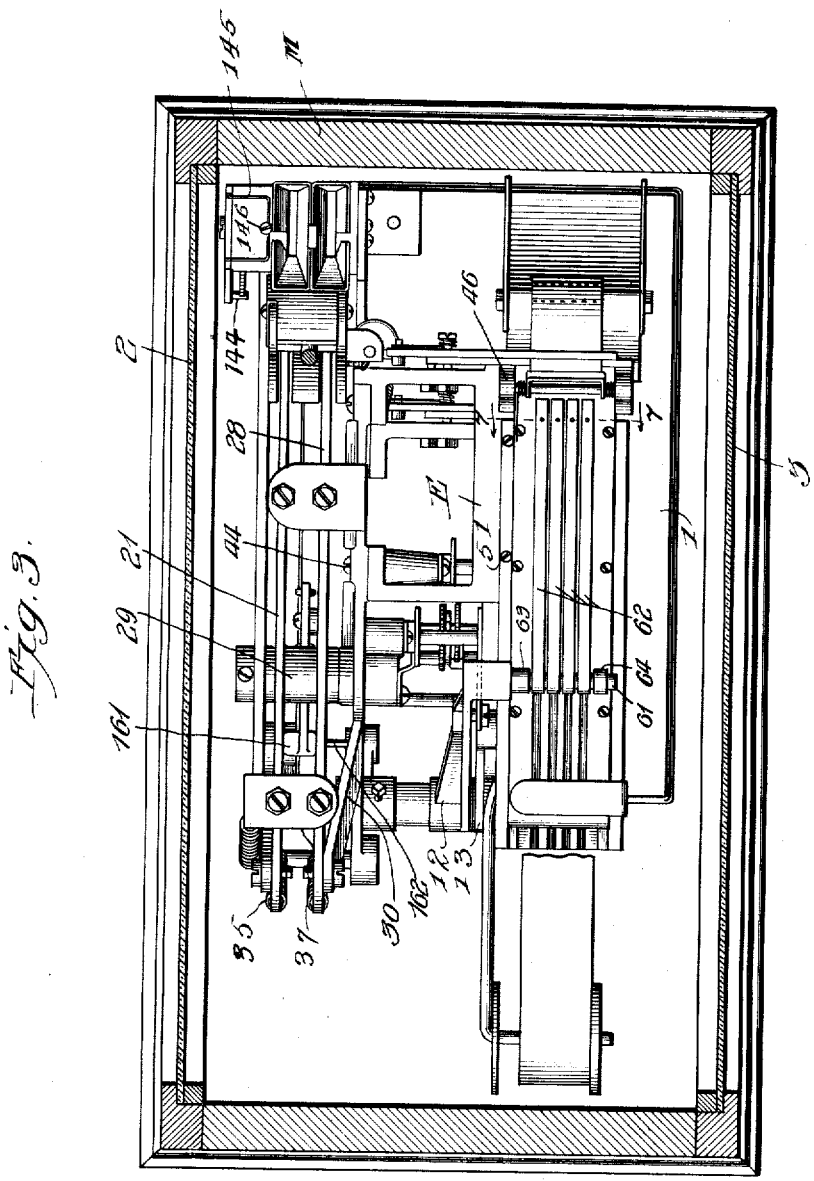

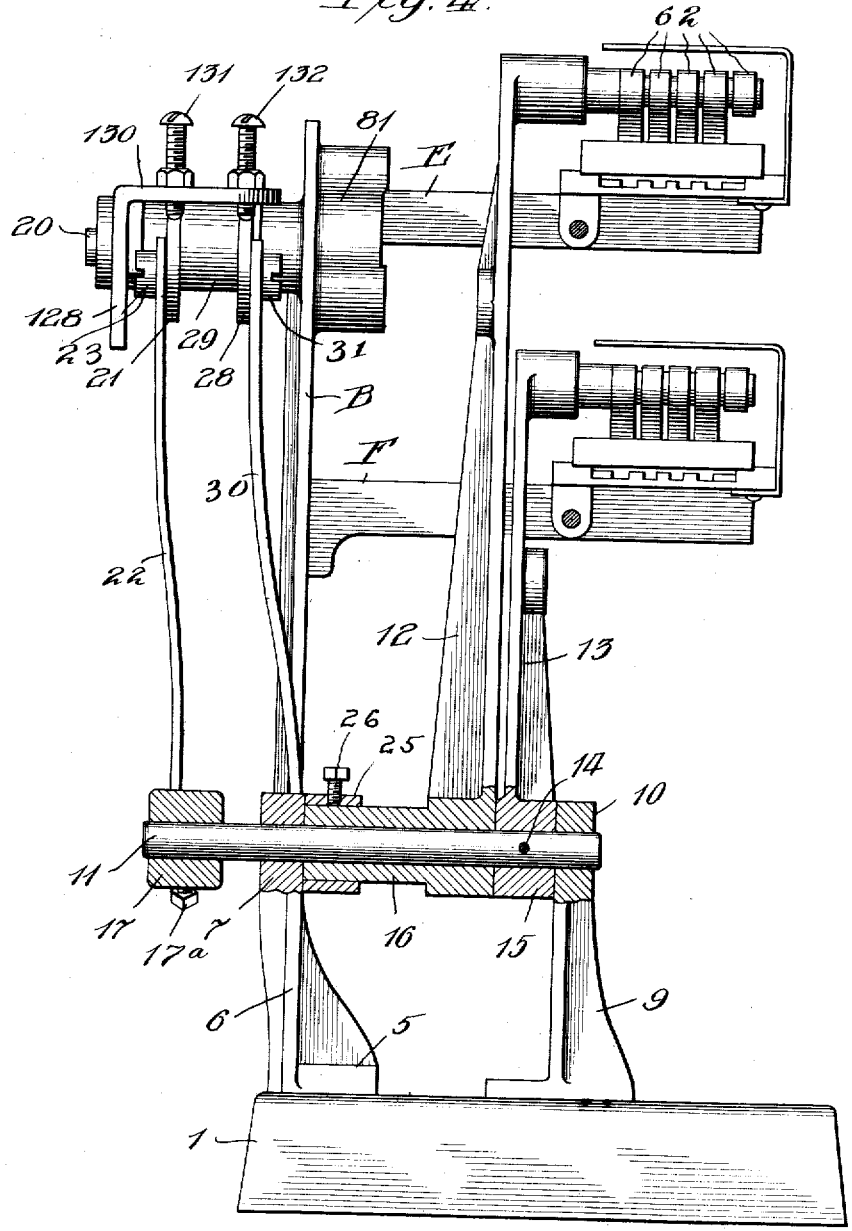

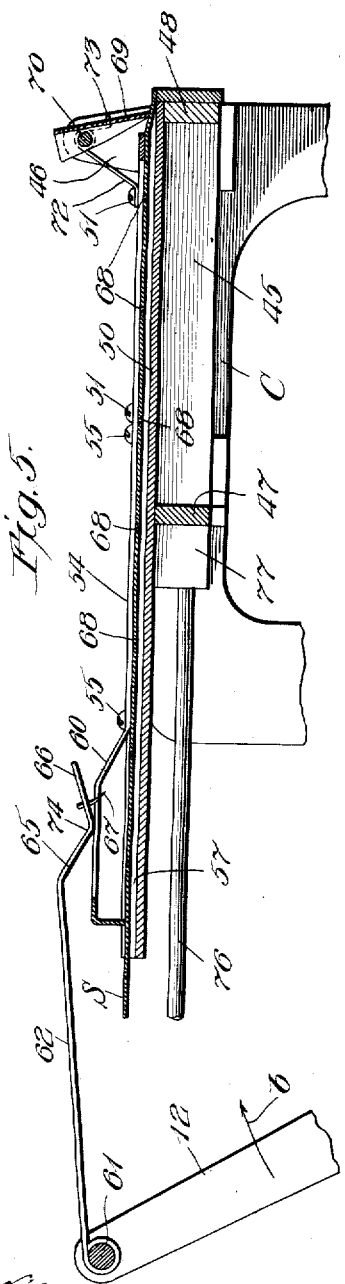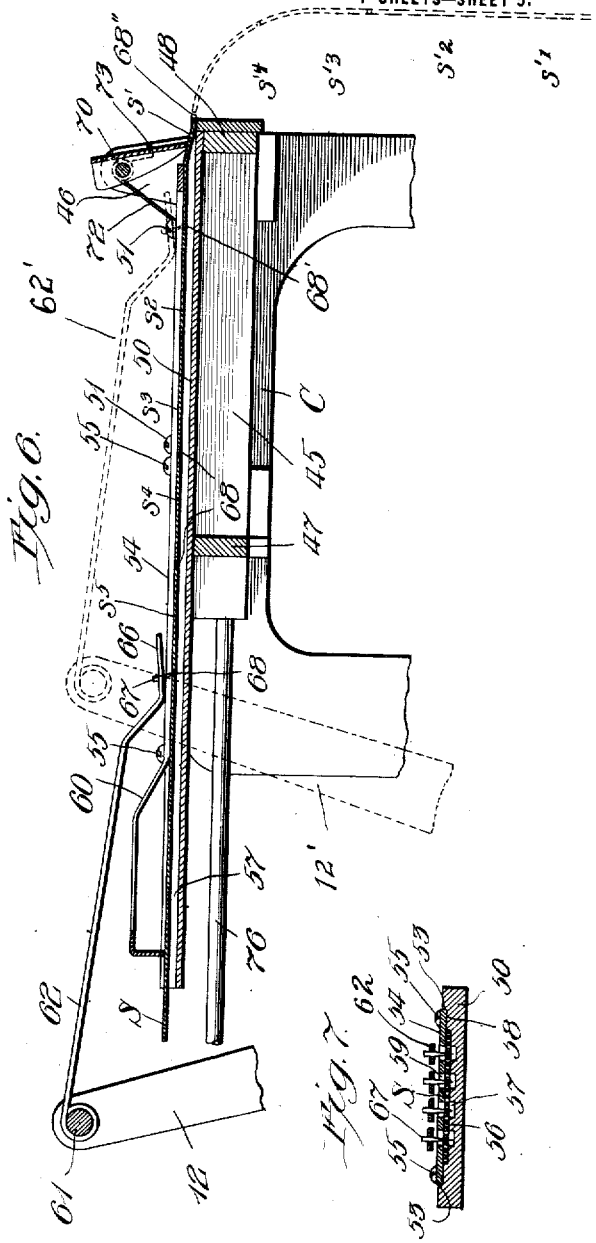

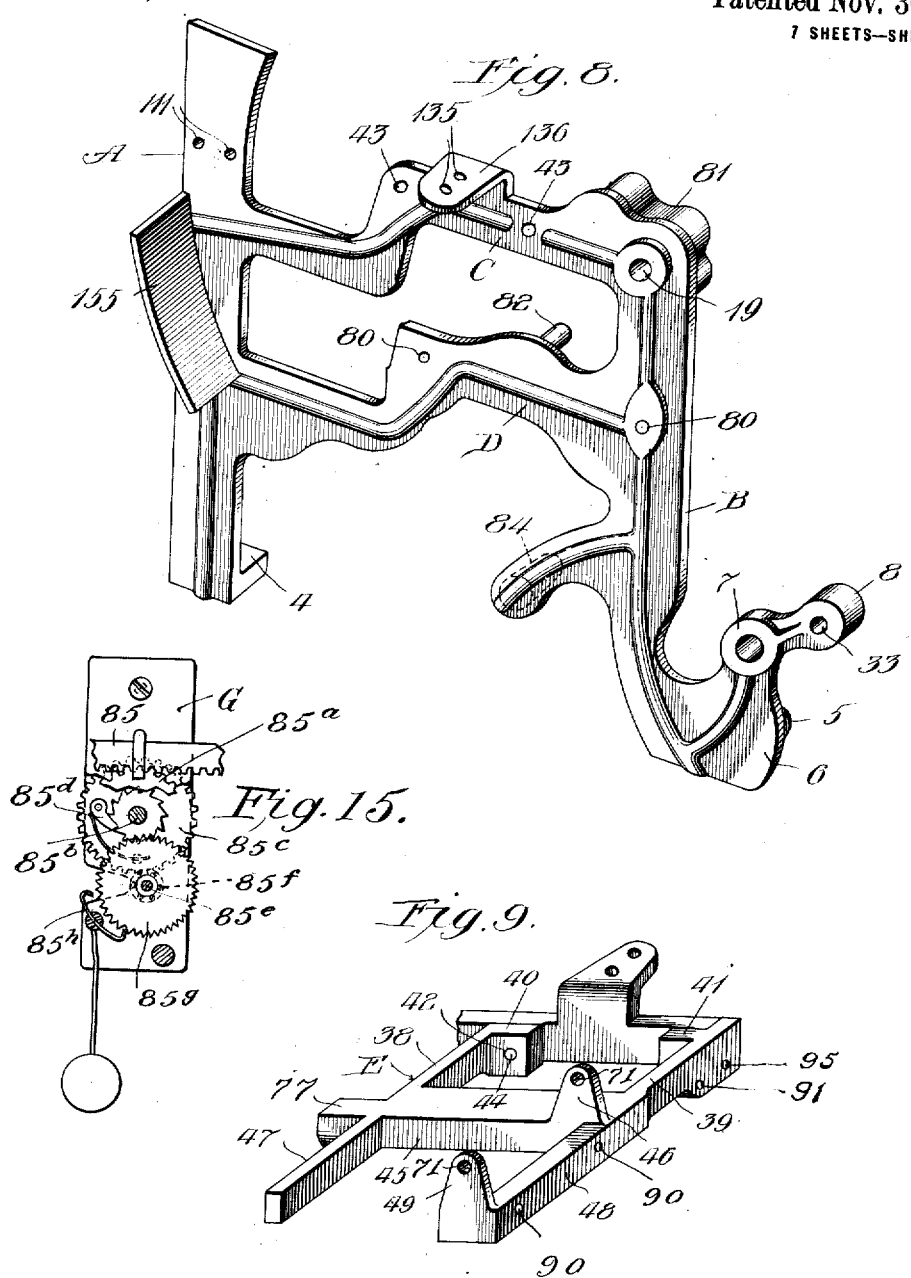

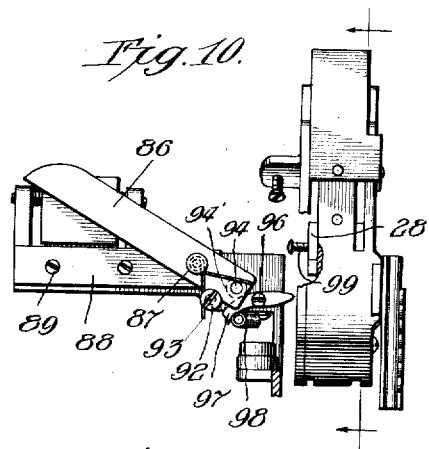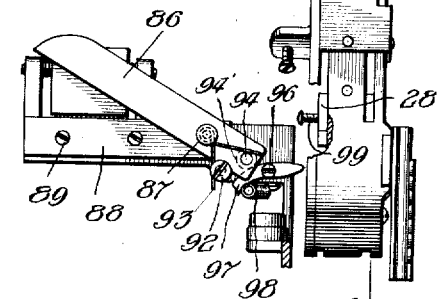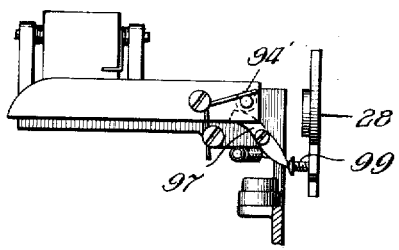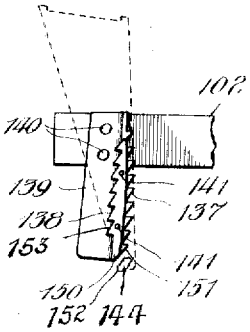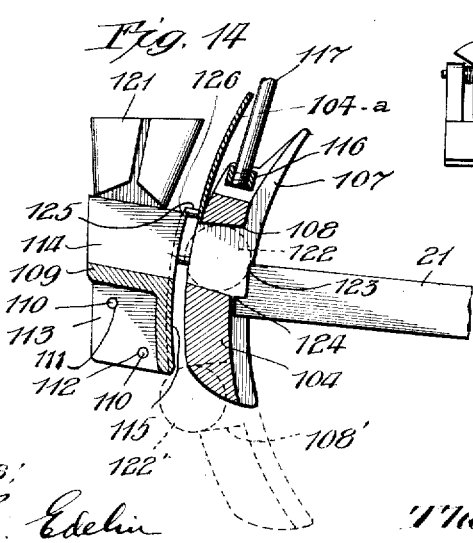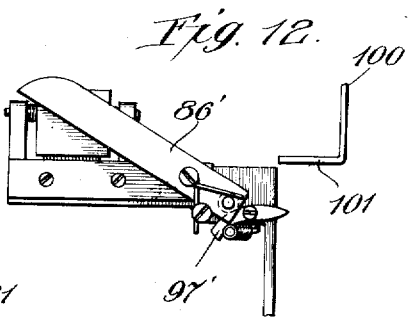

UNITED STATES PATENT OFFICE.

THEODORE BRIEGEL AND MILTON O. GRISWOLD, OF ROCK ISLAND, ILLINOIS, ASSIGNORS TO MIDLAND SUPPLY CO., OF DAVENPORT, IOWA, A CORPORATION OF IOWA.

STAMP-VENDING MACHINE.

1,162,128.　　　　　　Specification of Letters Patent.　　　Patented Nov. 30, 1915.

Application filed August 28, 1912, Serial No. 717,515. Renewed May 10, 1915. Serial No. 27,242.

*To all whom it may concern:*

Be it known that we, THEODORE BRIEGEL and MILTON O. GRISWOLD, citizens of the United States, residing at Rock Island, in the county of Rock Island and State of Illinois, have invented certain new and useful Improvements in Stamp-Vending Machines, of which the following is a specification, reference being had therein to the accompanying drawing.

Our invention relates to stamp vending machines of the class which operates to deliver postage stamps upon the deposition of a coin.

In this improved machine the stamps are drawn from a roll by means of feeding fingers constructed to engage in the perforations between the stamps so as to positively feed forward a predetermined number of stamps. The feeding fingers are operated by a lever which is, in turn, actuated by an arm, the latter being operatively connected with a handle, when a coin is deposited in the slot. This handle is operable from the outside of the machine casing.

Considering the feed mechanism of the invention more specifically, it consists of a plurality of independently hinged fingers provided near their free ends with downwardly projecting pins which operate in the longitudinal grooves of a pair of plates between which the stamps are fed forwardly. The engaging pins of the feeding fingers are curved forwardly at their lower ends so that they are automatically lifted out of the stamp perforations when the feeding fingers are moved rearwardly, but positively engage in those perforations when the fingers are moved forwardly during the feeding operation. By reason of the fact that the feeding fingers engage in the stamp perforations, the same length of stamps is always fed forwardly, so that there is no danger of a stamp being cut in two as has been found to be the case with feeding mechanisms heretofore constructed. In the present embodiment of our invention, we have provided two sets of feeding mechanisms, operable to deliver two different kinds and quantities of postage stamps. Thus, one feeding mechanism delivers two 2-cent stamps when a nickel is deposited in one coin slot provided on the outside of the casing; and the other feeding mechanism delivers four 1-cent stamps when a nickel is deposited in the other coin slot. When a nickel is deposited in each slot and the operating handle thereupon actuated, both feeding mechanisms are operated simultaneously. When a coin is deposited in one of the slots and the operating handle depressed, a cutting knife is operated to cut off the stamps fed forward at the end of the previous operation. In other words, the proper number of stamps is at once cut off from the strip and allowed to fall down the discharge opening when the machine is operated, so that the customer does not have to wait for the feeding of the stamps. This is automatically accomplished during the return movement of the parts, so that at the end of each operation the stamps have been fed forward to be cut off at the beginning of the next operation.

In addition to the above our invention embodies various features of novelty which will become apparent from a detailed description of the accompanying drawings, in which—

Figure 1 is a side elevation of the machine showing that side on which the coin chute is located; Fig. 2 is a side elevation of the opposite side of the machine, where the stamp feeding devices are located; Fig. 3 is a top plan view with the top of the casing removed; Fig. 4 is an enlarged rear view of a portion of the machine showing the operative connections between the feeding fingers and the arms which become connected with the operating handle when a coin is deposited in the machine; Fig. 5 is a longitudinal cross-sectional view through the feeding mechanism showing the feeding fingers in retracted position; Fig. 6 is a longitudinal cross-sectional view similar to Fig. 5, the feeding fingers being shown in full lines at the beginning of the feeding operation, and in dotted lines at the completion of this operation; Fig. 7 is a transverse cross-sectional view, on an enlarged scale, substantially on line 7—7 of Fig. 3, showing the location of the pins on the feeding fingers in the longitudinal channels of the plates between which the strip of stamps is fed forwardly; Fig. 8 is a detached perspective view of the main supporting casting; Fig. 9 is a detached perspective view of the horizontal bracket for supporting the base plates of the feeding mechanism; Fig. 10 is a front elevation of a portion of the machine showing how a cutting knife, associated with the upper feeding mechanism, is operated by the coin controlled arm connected with that feeding mechanism, the knife being shown in its normal or inoperative position; Fig. 11 is a front elevation similar to Fig. 10 (with certain parts omitted) showing the knife at the end of its cutting stroke. Fig. 12 is a front elevation of a portion of the machine showing how the coin controlled arm associated with the lower feeding mechanism operates the cutting knife associated with that mechanism; Fig. 13 is a detail side elevation showing a pawl and ratchet arrangement associated with the handle operated arm for compelling a completed stroke of this arm in either direction before the machine can be properly operated; Fig. 14 is a vertical longitudinal sectional view of the coin-controlled head illustrating the manner in which a coin is received and operative connections between the operating handle and the levers actuating the feeding mechanism thereby established; and Fig. 15 is a vertical sectional view through the escapement mechanism connected to the feeding device.

The machine as a whole is inclosed in a casing M and rigidly secured to the bottom of this casing in any suitable manner—as by means of screws or bolts passing through the casing into the base 1 of the machine. The sides 2 and 3 of the casing may be of glass and readily revoluble, being normally locked in place. To the base 1 is secured the main supporting casting, which is separately shown in Fig. 8 and consists in its main parts of the front standard A, the rear standard B, the upper transverse bar C and the lower transverse bar D. The standard A is provided with an inwardly extending lug 4, while the rear standard B is provided with an inwardly extending lug 5. These lugs are provided with openings through which screws or bolts pass for rigidly securing the entire casting to the base 1 near the right edge thereof (viewing the machine from the front). The standard B is provided with a bracket portion 6 on which are formed the bearings 7 and 8. The bearing bracket 9 is rigidly secured on the base 1 at the rear thereof, as shown in Fig. 4, at a suitable distance from the bracket portion 6 of the main casting. The bracket 9 is provided with a bearing 10 in transverse alinement with the bearing 7. Through the alined openings in the bearings 7 and 10 passes the rotatable shaft 11. Between the bearings 7 and 10 on the shaft 11 are supported the arms 12 and 13. As will be presently explained, the longer arm 12 operates the upper feeding fingers, while the shorter arm 13 operates the lower feeding fingers. The arm 13 is fixed to the shaft 11 so as to rotate therewith in any suitable manner, as by means of the pin 14 passing through the shaft 11 and the hub portion 15 of the arm. The arm 12, on the other hand, is rotatably mounted on the shaft 11 and is provided with an integral sleeve 16 which affords a broad bearing surface for the arm 12 on the supporting shaft 11. On the outer end of the shaft 11 is fixed the hub member 17 by means of a set-screw 17ᵃ or otherwise. The hub member 17 is provided with a forwardly extending crank arm 18, as best shown in Fig. 1. In the opening 19, at the upper end of the standard B, see Fig. 8, is secured the stud 20, on which is pivoted the lever 21. A link 22 is, at its upper end, pivoted to the rear end of the lever 21 by means of a suitable pivot pin 23, and at its lower end is pivoted to the crank arm 18 by means of a suitable pivot pin 24. It is clear that when the forward end of the lever 21 is depressed the crank arm 18 is rocked upwardly, whereby the shaft 11 is rotated in the direction indicated by the arrow "a". On the sleeve 16 of the arm 12 is fixed the hub member 25 by means of the set screw 26, or otherwise. From the hub member 25 extends the crank arm 27, as shown in Fig. 2. On the pivot stud 20 is mounted a second lever 28 which runs parallel to the lever 21 and is held spaced therefrom by the spacing collar 29, as shown in Figs. 3 and 4. The rear end of the lever 28 is connected with the crank arm 27 by the link 30 which is connected to the lever 28 by the pivot stud 31 and to the crank arm 27 by the pivot stud 32. It will be clear from the above that when the front end of the lever 28 is depressed, the crank arm 27 is rocked upwardly, with the result that the arm 12 is rocked rearwardly. In the opening 33 of the arm 8 is secured the transverse pin 34. A retracting coil spring 35 is at its upper end connected to the rear end of the lever 21 at the point 36, and is at its lower end connected to the pin 34. A similar retracting spring 37 is at its upper end connected to the rear end of the lever 28 and at its lower end to the stud 34. The springs 35 and 37 draw the actuated levers 21 and 28 and all the connected parts back to normal position when the levers are released at their front ends, as will hereinafter be explained.

We will now describe the feeding mechanism of our machine. Although we have shown the machine as provided with two feeding mechanisms, it will only be necessary to describe the detailed construction of one, since both are alike in structure and operation, with the exception that the upper feeding mechanism is slightly longer than the lower one to accommodate the longer stroke of the upper feeding fingers. To the inner side of the cross-bar C of the main casting is secured the horizontal bracket indicated as a whole by E and shown separately in Fig. 9. This bracket consists of a pair of parallel arms 38 and 39 provided with inwardly turned projections 40 and 41 respectively. These projections have openings 42 in alinement with the openings 43 in the cross-bar C. Through the alined openings 42 and 43 pass screws or bolts 44 for rigidly securing the bracket E to the main casting. The parallel arms 38 and 39 of bracket E are connected by the cross-piece 45, from which rises the lug 46. The extensions 47 and 48 form, in effect, continuations of the arms 38 and 39 respectively. From the outer end of the extension 48 rises the lug 49 in transverse alinement with the lug 46. The bracket E, as thus described, is adapted to support the plates of the upper feeding mechanism. The cross-sectional views shown in Figs. 5 and 6 are taken through the upper feeding mechanism, the details of which will now be described, it being understood that this description pertains to the lower feeding mechanism as well. On the extensions 47 and 48 the lower plate 50 is secured by means of screws 51. The plate 50 is provided with the longitudinal shoulders 53 between which lies the upper plate 54. The two plates are secured together by means of screws or other fastening devices 55. From the bottom of the lower plate 50 extend the longitudinal ridges 56 spaced from each other so as to form grooves 57. The ridges 56 terminate below the under side of the upper plate 54 so as to form a recess or chamber 58 for accommodating the stamp strip "S". The upper plate 54 is provided with longitudinal slots 59 in alinement with the grooves 57 of the lower plate. The upper plate 54 curves upwardly at 60 for a purpose to be presently explained. To the upper end of the arm 12 is fixed the lateral stud 61 on which are pivoted the feeding fingers 62, of which there are four shown in the present illustration. These fingers are mounted side by side on the stud 61 and are free to swing independently of each other about the stud as an axis. The fingers are held in vertical alinement over the slots 59 by means of the collars 63 and 64 on the stud 61. The fingers curve downwardly at 65 so that the end portions 66 may rest on the upper plate 54. Each finger is at its free end provided with a downwardly and forwardly extending pin 67 having a sharp point so as to enter perforations 68 in the stamp strip "S".

The operation of the feeding mechanism will now be understood and may briefly be stated as follows: When the arm 12 is rocked to the rear by the actuation of the lever 28 (which actuation is brought about by suitable coin controlled means to be hereinafter explained) the feeding fingers 62 are drawn backwardly from the stamp strip "S," until they reach the position indicated in Fig. 5. During this rearward movement of the feeding fingers the stamp strip "S" is held against accidental rearward movement by the spring pressed gate 69 pivoted between the lugs 46 and 49 on the bracket E by means of the spindle 70 journaled in the alined openings 71 at the upper end of the lugs. A suitable spring 72, bearing at its lower end against the top plate 54 and at its other end bearing against the front of the gate 69 at the point 73, presses yieldingly against the stamp strip "S," as shown in Figs. 5 and 6. As this gate is tilted forwardly at its lower end, it does not interfere with the forward movement of the stamps but positively prevents rearward movement thereof. During the rearward movement of the fingers 62 the pointed pins 67 are dragged over the stamp strip. As the fingers are very light in weight and as the points of the pins are curved forwardly, no mutilation of the stamps takes place during the rearward movement of the fingers. When the bearing points 74 of the fingers reach the upwardly turned portion 60 of the slotted plate 54, the pins 67 are lifted out of contact with the stamp strip, as shown in Fig. 5. When the arm 12 is rocked forwardly under the action of the spring 35 (as previously explained) in the direction of the arrow "$b$," in Fig. 5, the feeding fingers are moved forwardly without affecting the stamp strip until they reach the position indicated in full lines in Fig. 6. In this position of the fingers, the pins 67 enter the perforations 68 of the stamp strip. The arm 12 continues to move in the direction of the arrow "$b$" until it reaches its foremost position, as indicated by the dotted lines 12' in Fig. 6. During this movement of the arm 12 the feeding fingers travel from the position shown in full lines in Fig. 6 to the position shown in dotted lines at 62'. As shown in this figure, there are five stamps in front of the pins of the fingers 62, these stamps being, for the sake of clearness, indicated by $s^1$, $s^2$, $s^3$, $s^4$, and $s^5$. It will also be observed that the distance traveled by the pins 67 during the feeding operation is equal to the length of four stamps. At the end of the feeding operation, the line of perforations 68 which the pins engaged at the beginning of the feeding operation will be at the point indicated by 68' in Fig. 6, the forwardly fed stamps being indicated by $s'^1, s'^2, s'^3, s'^4$. At the end of the feeding operation the stamp $s^5$ in Fig. 6 will occupy the position in which the stamp $s^1$ is shown. By cutting mechanism to be hereinafter described, the forwardly fed stamps are, at the beginning of the next operation severed along the line of perforations indicated by 68''. The stamp strip "S" is fed from a roll of stamps R mounted on the stud 75 which projects laterally from the rod 76. This rod is supported from the bracket E by having its end inserted in the lug 77 extending rearwardly of the bracket E, as best shown in Fig. 2. The roll of stamps is prevented from slipping off the stud 75 by any suitable means, such as the retaining bar 78 secured to the end of the stud 75.

The plates of the lower feeding mechanism are supported on the bracket F which is similar to the bracket E and is supported laterally from the lower cross-piece D of the main casting by means of screws 79 passing through openings 80 in the cross piece D into the bracket. As previously stated, the construction and operation of the lower feeding mechanism are identical with those of the upper feeding mechanism above described in detail, except that the arm 13 has a throw equal to one-half of the throw of the longer arm 12 to cause only two stamps to be fed forwardly during each operation of the machine. The four stamps fed by the upper feeding mechanism are 1-cent stamps, while the two stamps fed by the lower mechanism are 2-cent stamps. The rapidity of movement of the arms 12 and 13 during the feeding operation is regulated by a suitable escapement control indicated as a whole by G.

The frame containing the escapement control for the arm 12 is supported from the boss 81 formed at the upper end of the standard B of the main casting. The lower escapement control is supported from the projections 82 and 84. The rack bars 85 pivoted to the arms 12 and 13 connect these arms with their respective escapement controls. As the devices are similar in structure we will describe the one controlling the return of the arm 12. The rack bar 85 engages the upper face of a pinion 85$^a$ which is secured on the end of a shaft 85$^b$. This shaft is carried by the frame G as best illustrated in Fig. 15. On the opposite end of the shaft is loosely mounted a gear 85$^c$ which has a ratchet connection with the shaft 85$^b$ through a pawl 85$^d$. This ratchet connection allows the shaft 85$^b$ to turn loose within the gear 85$^c$ when the rack moves rearward but causes the gear to rotate as the rack moves in the opposite direction. A second shaft 85$^e$ is mounted below the shaft 85$^b$ and carries a gear 85$^f$ which meshes with gear 85$^c$. This same shaft also carries a toothed wheel 85$^g$ which operates upon a fork and pendulum 85$^h$. By varying the weight or length of the pendulum the rapidity of feed may be easily determined. The feed operating arms 12 and 13 being thus controlled during the feeding operation, the stamps are fed forwardly with slowness and evenness, thereby avoiding all danger of a spasmodic or sudden feeding.

We will now describe the cutting mechanism for severing the forwardly fed stamps from the strip. The upper cutting knife 86 is pivoted at 87 to the bar 88 secured to the extension 48 of the bracket E by means of screws 89 passing through the bar and through openings 90 in the extension 48. Through the opening 91 in the arm 39 of the bracket E (see Fig. 9) extends the lug or screw 92 which forms a stop for the knife 86. The spring 93 bearing at one end against the screw or lug 92 is coiled about the pivot stud 87 of the knife and at its other end bears against the transverse lug 94 which projects from both sides of the knife. The rearward projection of this lug is indicated in dotted lines at 94' in Figs. 10 and 11. Into the opening 95 in the arm 39 of the bracket E (see Fig. 9) extends the pivot screw 96 on which is pivoted the tripping dog 97 which rests normally in the position shown in Fig. 10 in engagement with the free end of the coil spring 98 attached to the bracket E at a suitable point. The rearward extension 94' of the lug 94 carries a roller and is in the path of movement of the tripping dog 97, so that when the head of this dog is moved up, as shown in Fig. 11, the knife 86 is forced downwardly. During this downward movement the knife 86 coöperates with the bar 88 to shear off the forwardly fed stamps, which thereupon drop down to the bottom of the discharge opening provided at the front of the casing. The tripping of the dog 97 is accomplished by the lug 99 extending laterally from the lever 28. This lug may be in the form of a screw, the head of which engages the tail end of the tripping dog 97 when the lever is operated, thereby moving the dog 97 into the position shown in Fig. 11. As the lug 99 continues to travel downwardly from the position shown in Fig. 11 it passes out of engagement with the tripping dog 97, whereupon the spring 93 immediately rocks the knife 86 upwardly into normal position, as shown in Fig. 10. During this upward movement of the knife, the head of the dog 97 is forced downwardly into the position shown in Fig. 10. On the upward swing of the lever 28 the lug 99 will contact with the lower edge of the pawl 97 forcing it down against the action of the coil spring 98. As the lug passes by the pawl, the spring forces it back into contact with the roller 94' on the knife ready for the next cutting stroke.

The cutting knife 86' associated with the lower feeding mechanism is operated in precisely the same manner as the knife for the upper feeding mechanism, except that it is controlled by the movement of the lever 21. This lever is provided with a downward extension 100 which terminates in a lateral shoulder 101, as best shown in Fig. 12. As the lever 21 is moved downwardly, the shoulder 101 engages the tail end of the tripping dog 97' and causes the knife 86' to be operated in precisely the same manner as the knife 86.

The connections between each of the levers 21 and 28 and their respective feeding and cutting mechanisms are such that the cutting mechanisms are operated before the feeding arms begin their forward travel. In fact, in the present embodiment of the invention, the cutting knives are operated before the feeding fingers have reached the limit of their rearward movement. It is only essential, however, that the cutting of the previously fed stamps shall take place before the feeding fingers begin their forward or feeding operation.

We have already stated that the levers 21 and 28 are adapted to be actuated by coin controlled means, which we will now describe.

The lever 102 is pivoted on the stud 20, adjacent the lever 21 and suitably spaced therefrom. A collar 103 fixed upon the outer end of the stud 20 holds the lever 102 against lateral movement on the stud 20. The lever 102 carries at its front end a head piece 104 secured to the lever by the screw 105. The lever 102 engages between the shoulders 106 formed on the head piece, whereby the latter is firmly clamped to the lever. The head piece 104 is provided with a pair of vertical slides 107 into which extend the front ends of the operating levers 21 and 28, as shown in Fig. 14. The operating lever 28 is not shown in this figure because it is directly back of the lever 21. The head piece 104 is provided with a pair of coin openings 108 in alinement with the slots 107. The head piece 104 and the slots 107 have a curvature struck off from the axle of the stud 20 as the center. The casting indicated as a whole by 109 is secured to the upper end of the standard A by means of screws or bolts 110 passing through the alined openings 111 and 112 provided, respectively, in the standard A and the extension 113 of the casting 109. This casting is provided with a pair of slots 114 in alinement with the coin openings 108. The slots 114 extend downwardly, so that when a coin is deposited in either slot it rolls by gravity into the alined opening 108. The rear face 115 of the casting 109 is curved concentrically with the head piece 104. On the cross piece 116, pivoted between the sides of the head piece 104, is secured the lower end of the handle 117, which extends through the casing M and is, at its upper end, provided with a nob or end piece 118. On the top of the casing is secured a plate 119 provided with an opening 120 through which the handle bar 117 extends. This opening forms a guide opening for the handle. The plate 119 is provided with a pair of coin slots 119' in alinement with the slots 114. Hoppers 121 are secured on top of the casting 109 to guide the coin from the slots 119' into the slots 114. From the construction shown in Fig. 14, it is clear that the head piece 104 is normally disconnected from the levers 21 and 28. However, when a coin is deposited in one of the slots in the plate 119, the coin rolls into the alined coin opening 108 and occupies the position indicated by the dotted circle 122 in Fig. 14. In this position the coin 122 abuts against the shoulder 123 formed at the front end of the lever 21. With the coin in this position, it will be seen that when the head-piece 104 is moved downwardly by the depression of the hand rod 117, the coin 122 engages the extension 124 of the lever 21 and thereby connects the lever operatively with the downwardly moving head piece 104. The lever 21 is thereupon moved downwardly until the slot 107 has reached the position indicated by the dotted lines 108'. When this happens, the coin, which is now at 122', rolls out of the opening 108 into the receiving chute to be presently referred to. As soon as the lever 21 (or 28) is thus released by the coin, the spring 35 (or 37) restores the lever to its upper position. During the period that the lever 21 (or 28) is thus restored, the feeding fingers of the associated feeding mechanism are moved forwardly to pay out the proper number of stamps, as previously described in detail. The connections between the lever 21 (or 28) and their respective feeding fingers are so multiplied that but a small annular movement of these levers is necessary to move the feeding fingers through the proper distance. The head piece 104 is guided in its movements by the pins 125, which operate in the curved slot 126 formed in the casting 109 intermediate the coin slots 114. The guiding slot 126 is indicated in dotted lines in Fig. 14. In order to prevent a deposited coin from falling out of the slots 114 when the head piece 104 is in its depressed position, the head piece 104 is provided with a shield 104a which is arranged to close the slots 114 when the head piece is in its lowermost position. When the hand rod 117 is released, the lever 102 is retracted to normal position by the spring 127 which is, at its lower end, secured to the stud 34 and at its upper end to the bracket 128 secured to the rear end of the lever 102 by means of screws or rivets 129. As best shown in Fig. 4, the bracket 128 is provided with a horizontal portion 130 extending over the levers 21 and 28. The horizontal portion 130 carries the adjustable screws 131 and 132 in alinement, respectively, with the levers 21 and 28. These screws are arranged to engage the upper edges of the levers 21 and 28, whereby the lever 102 becomes temporarily connected with the actuated levers 21 (or 28), during the return movement of the levers. Without this temporary connection, the lever 102 would fly up suddenly when the hand rod 117 is released. However, this temporary connection compels the lever 102 to return slowly to its normal position, simultaneously with the lever 21 (or 28), the return movement of these levers being regulated by the escapement controlling devices heretofore referred to. A stop lug, in the form of an adjustable screw 133, screwed into the casting 109, engages the lever 102 at its forward end and forms a positive stop therefor to limit its upward movement. The upward movement of the levers 21 and 28 is limited by adjustable screws 134 which extend through the openings 135 provided in the lateral extension 136 formed on the cross bar C of the main supporting casting. The openings 135 are in vertical alinement with the levers 21 and 28.

In order to compel the operator to complete each stroke of the lever 102, we have provided the latter with two sides of oppositely extending ratchet teeth 137 and 138. The teeth 137 are formed on the downwardly projecting piece 139 secured to the arm 102 by screws or rivets 140. The teeth 138 are rigidly secured to the piece 139 by screws or rivets 141. A double acting dog 142 is pivoted at 143 to the outer side of the casting 109. This dog is, at its lower end provided with an inwardly extending toe 144 and is normally held in the position shown in Figs. 1 and 13 by any suitable spring means. In Figs. 1 and 3 we have shown a U-shaped spring 145 secured at its central point to the top of the casting 109 by means of the screw 146. The legs of this U-shaped spring extend laterally of the machine and at their outer ends engage the upper edge of the dog 142 at the points 147 and 148. The pawl of the dog 142 is at its upper end provided with the shoulders 149 against which the free ends of the U-shaped spring bear, thereby holding the spring yieldingly in the position shown in the drawings. The toe 144 is provided with a beveled front edge adapted to engage the correspondingly beveled lower end 151 of the ratchet teeth 137 and 138, so that the toe 144 is deflected rearwardly into engagement with the teeth 137 as the lever 102 is depressed. With this engagement between the dog 142 and the teeth 137 it is necesssary to complete the downward stroke of the lever 142 before the latter can be returned to a normal position. Just before the lever 102 reaches its lowermost position, the toe 144 passes out of engagement with the teeth 137, and the dog 142 is rocked forwardly a little under the action of the spring 145, so that the rear beveled edge 152 of the toe 144 slides over the beveled upper end 153 of the teeth 138 when the lever 102 returns upwardly to normal position. This engagement between the beveled surfaces 152 and 153 deflects the toe 144 into engagement with the teeth 138 and makes it necessary that the lever 102 be returned to normal position before it can be depressed again.

When the coin leaves the slot 108 in the head piece 104, as previously explained, it drops into the coin chute 154 arranged in alinement with the coin slots 114. The coin chute is carried by the main supporting casting, being at the front secured to the standard A and at the rear to the standard B. The curved lug 155 formed laterally on the standard A closes the coin chute at the front upper end and guides the coins into the runway 156 of the chute. The rear end of the runway is open, so that the coins drop into a suitable receptacle 157. Over the runway of the chute is pivoted a coin releasing lever 158 which carries a pair of depending links 159 and 160, one or the other of which is always in the path of the coin so as to hold the same until the next coin enters the runway. The lever is normally in the position shown in Fig. 1, but is adapted to be rocked in a counter-clockwise direction (as viewed in Fig. 1) whenever the lever 21 or 28 is operated. The lever 158 is at its rear end provided with a lateral lug 161 which extends from both sides of the lever. This lug is adapted to be engaged by the front end of the crank arm 18 and also by the pin 162 extending laterally from the link 30 as shown in Fig. 3. Therefore, whenever either the crank arm 18 or the link 30 is moved upwardly by the operation of the lever 21 or 28, respectively, the rear end of the lever 158 is tilted upwardly so as to withdraw the link 160 from the coin 163 and allow the same to drop out of the runway into the receptacle 157. The operation of the lever 158 is so timed that when a coin is released from the slot 108 in the head piece 104 and rolls down the inclined runway, the lever 158 is in its actuated position, so that the coin is stopped by the link 159. Just before the parts reach the limit of their return movement, the rear end of the lever 158 is moved down by gravity sufficiently far to cause the link 159 to release the coin and allow it to roll against the link 160, by which it is held until the next operation of the machine.

What we claim is:

1. In a stamp vending machine, the combination of a main supporting frame, a pair of arms pivoted in said frame, a lever connected to each arm for operating the same, a movable head-piece, means for forming an operable connection between the head-piece and either one or both of the levers and stamp feeding mechanisms connected to each of the said arms.

2. In a stamp vending machine, the combination of a main supporting frame, a shaft journaled therein, a pair of arms mounted on said shaft, one of said arms being fixed to the shaft so as to rotate therewith, the other arm being rotatably mounted on the shaft, a lever connected to the said shaft, a second lever connected to the second mentioned arm, means for operating either one or both of said levers and stamp feeding mechanisms connected to each of the said arms.

3. In a stamp vending machine, the combination of a main supporting frame, a pair of arms pivoted in said frame, a lever connected to each arm for operating the same, a movable head-piece, means for forming an operable connection between the head-piece and either one or both of the levers when said head-piece is moved in a downward direction, springs connected to said levers to hold them normally in an upward position, and stamp feeding mechanisms connected to each of the said arms.

4. In a stamp vending machine, the combination of a frame, a stamp-way mounted thereon, feeding fingers adapted to reciprocate across said stamp-way and feed a predetermined number of stamps therethrough, means for moving said fingers rearward on said stamp-way, a spring for drawing the fingers forward on the stamp-way and an escapement control for regulating the speed at which said fingers move forward.

5. In a stamp vending machine, the combination of a frame, a stamp-way mounted thereon, feeding fingers adapted to reciprocate across said stamp-way and feed a predetermined number of stamps therethrough, means for moving said fingers rearward on said stamp-way, a spring for drawing the fingers forward on the stamp-way, an escapement control connected to the fingers and means for disconnecting the fingers from said escapement control as they move rearward over the stamp-way.

6. In a stamp vending machine, the combination of a main supporting frame, an arm pivoted in said frame, a lever connected to the said arm, means for moving said lever from its normal position, a spring adapted to return said lever to its normal position, an escapement control for regulating the speed at which said lever returns to its normal position, and a stamp feeding mechanism connected to the said arm.

7. In a stamp vending machine, the combination of a main supporting frame, stamp-ways mounted upon said frame, feeding fingers associated with the stamp-ways, a pivoted arm for operating each set of feeding fingers, a spring connected with each pivoted arm operating to return said arm and the feeding fingers to normal position after each complete stroke thereof, an escapement control connected with each arm operating against the retraction of said arms responsive to said springs, and means for operating said arms.

8. In a stamp vending machine, the combination of a main supporting frame, a slotted stamp-way mounted on said frame, pivoted feeding fingers, pins formed on the ends of said fingers and adapted to engage the stamps through said slots, elbows formed on said fingers at the rear of the point and adapted to rest on the guides and limit the penetration of said points, and a pivot arm for operating said fingers along said stamp-way.

9. In a stamp vending machine, the combination of a main supporting frame, a slotted stamp-way mounted on said frame, pivoted feeding fingers, pins formed on the ends of said fingers and adapted to engage the stamps through the said slots, elbows on the said fingers at the rear of the points adapted to rest upon said stamp-way, the rear of said stamp-way being upwardly inclined from the stamp strip and a pivoted arm for operating said fingers along said stamp-way.

10. In a stamp vending machine, the feeding mechanism comprising a stamp-way, the upper portion of which is provided with longitudinal slots, a plurality of feeding fingers, pins connected to the lower ends of the fingers and adapted to extend through the slots and engage the stamps in the perforations thereof, said pins being at their lower ends bent forwardly so as to readily ride out of the perforations when the fingers are actuated rearwardly, a pivoted arm provided at its upper end with a stud on which said fingers are pivotally mounted independently of each other, means for operating said arm, and a stamp gate at the forward end of said stamp way whereunder said stamps may forwardly pass, said gate being adapted to hold said stamps against backward movement or retraction.

11. In a stamp vending machine, the combination of a supporting frame, a pair of horizontal brackets extending laterally therefrom, a slotted stamp-way mounted upon each bracket, a plurality of feeding fingers adapted to extend through the slots and engage the stamps, a pivoted arm provided at its upper end with a stud on which said fingers are pivotally mounted independently of each other, an operating lever connected with each of said arms and adapted to actuate the same, springs connected with each of said levers to retract the same together with the connected arms to their normal position after each full throw of said levers, an escapement control connected with each arm operating against the retractive power of the springs during the feeding operation, a spring pressed gate at the mouth of each stamp-way permitting the advance and preventing the retraction of the stamp strip therethrough, and means for operating the levers connected with the pivoted control arms.

12. In a stamp vending machine, the combination of a supporting frame, a pair of horizontal brackets extending laterally therefrom, a slotted stamp-way mounted upon each bracket, a plurality of feeding fingers adapted to extend through the slots and engage the stamps, a pivoted arm provided at its upper end with a stud on which said fingers are pivotally mounted independently of each other, an operating lever connected with each of said arms and adapted to actuate the same, springs connected with each of said levers to retract the same together with the connected arms to their normal position after each full throw of said levers, an escapement control connected with each arm operating against the retractive power of the springs during the feeding operation, a spring pressed gate at the mouth of each stamp-way permitting the advance and preventing the retraction of the stamp strip therethrough, a cutting mechanism at the mouth of each stamp-way, connections between the cutting mechanism and the operating levers whereby the said cutting mechanism is operated to sever the stamp strip before the feeding action takes place, and means for operating the levers connected with the pivoted control arms.

In testimony whereof we affix our signatures, in presence of two witnesses.

THEODORE BRIEGEL.
MILTON O. GRISWOLD.

Witnesses:
R. W. GOULD,
F. E. HADSELL.

Correction in Letters Patent No. 1,162,128.

It is hereby certified that in Letters Patent No. 1,162,128, granted November 30, 1915, upon the application of Theodore Briegel and Milton O. Griswold, of Rock Island, Illinois, for an improvement in "Stamp-Vending Machines," an error appears in the printed specification requiring correction as follows: Page 2, line 31, for the word "revoluble" read *removable;* and that the said Letters Patent should be read with this correction therein that the same may conform to the record of the case in the Patent Office.

Signed and sealed this 1st day of February, A. D., 1916.

[SEAL.]

J. T. NEWTON,
*Acting Commissioner of Patents.*

Cl. 211-33